United States Patent
Sasaki et al.

[19]

[11] Patent Number: 5,938,135
[45] Date of Patent: Aug. 17, 1999

[54] WEBBING RETRACTOR

[75] Inventors: Sumikazu Sasaki; Seiji Hori, both of Aichi-ken, Japan

[73] Assignee: Kabushiki Kaisha Tokai-Rika-Denki-Seisakusho, Aichi-ken, Japan

[21] Appl. No.: 09/045,694

[22] Filed: Mar. 23, 1998

[30] Foreign Application Priority Data

Apr. 8, 1997 [JP] Japan .................................... 9-089792

[51] Int. Cl.$^6$ .......................... B60R 22/28; B60R 22/46
[52] U.S. Cl. ...................................... 242/374; 242/379.1
[58] Field of Search ............................. 242/374, 379.1; 280/805, 806; 297/478, 480, 470, 471, 472

[56] References Cited

U.S. PATENT DOCUMENTS

| | | | |
|---|---|---|---|
| 5,344,095 | 9/1994 | Frei | 242/374 |
| 5,522,564 | 6/1996 | Schmidt et al. | 242/374 |
| 5,526,996 | 6/1996 | Ebner et al. | 242/379.1 |
| 5,624,083 | 4/1997 | Modinger et al. | 242/374 |
| 5,671,894 | 9/1997 | Dybro et al. | 242/374 |
| 5,738,293 | 4/1998 | Fohl | 242/374 |
| 5,788,176 | 8/1998 | Ebner et al. | 242/374 |

FOREIGN PATENT DOCUMENTS

| | | |
|---|---|---|
| 4-92748 | 3/1992 | Japan . |
| 7-47923 | 2/1995 | Japan . |

*Primary Examiner*—John M. Jillions
*Attorney, Agent, or Firm*—Sixbey Friedman Leedom & Ferguson; Thomas W. Cole

[57] ABSTRACT

A webbing retractor includes a spool around which a webbing is wound in such a manner as to be capable of being pulled out; an energy absorbing member which is deformed by the spool when a rotating force acting in a pulling-out direction of the webbing is applied to the spool at the time of a sudden deceleration of a vehicle, so as to prevent an increase in a tensile force of the webbing; a pretensioner which is connected to the spool when a deceleration of a predetermined value or more is applied, so as to rotate the spool in a taking-up direction of the webbing; and a canceling portion disposed between the spool and the pretensioner so as to cancel the stopping of rotation in a paying-out direction of the webbing by the pretensioner after operation of the pretensioner. Accordingly, after the operation of the pretensioner, the rotation of the spool in the pulling-out direction of the webbing is not restricted, and the energy absorption by the energy absorbing member is not restricted.

20 Claims, 6 Drawing Sheets

WEBBING RETRACTOR

BACKGROUND OF THE INVENTION

1. Field of the Invention

The present invention relates to a webbing retractor which is provided with a pretensioner for imparting a tensile force to a webbing at the time of a sudden deceleration of a vehicle as well as a force limiter for preventing a tensile force of a predetermined value or more from being applied to the webbing.

2. Description of the Related Art

Among webbing retractors which are installed in vehicles, there is a type which is provided with a pretensioner for taking up the webbing and applying a tensile force thereto when a large deceleration of a predetermined value or more is applied to the vehicle, so as to restrict a wearer of the webbing without slack (refer to, among others, Japanese Patent Application Laid-Open (JP-A) No. 4-92748). FIG. 6 shows a webbing retractor 300 having such a pretensioner.

With this webbing retractor 300, a hollow cylindrical spool 306 around which a webbing 304 is wound is rotatably supported by a frame 302.

A pretensioning shaft portion 308 which is provided integrally at one end of the spool 306 is inserted loosely in a drum 310. The drum 310 is arranged such that a pair of semicircular clamping portions 312 are connected to each other by a pair of connecting portions 314 which are curved substantially in an S-shape, and the drum 310 as a whole is thus formed in a substantially hollow cylindrical shape. An intermediate portion of a wire 318 having one end connected to a drive plate 316 is wound around the outer periphery of the drum 310. An insertion hole 320 into which the drum 310 is inserted is formed in a central portion of the drive plate 316. A pair of engaging portions 322 provided projectingly on the drum 310 are respectively accommodated in a pair of enlarged-diameter portions 320A formed in the inner periphery of the drive plate 316 defining the insertion hole 320. The drive plate 316 is thus adapted to rotate integrally with the drum 310.

In addition, the other end of the wire 318 is connected to a piston (not shown) inside a cylinder 324. When a deceleration of a predetermined value or more is applied to the vehicle, a gas generator is operated, and the piston is rapidly drawn into the cylinder.

A lock portion (not shown) is provided at the other end of the spool 306, and when a deceleration of a predetermined value or more is detected, this lock portion locks the rotation of the spool 306 in the pulling-out direction of the webbing 304, thereby allowing the rotation only in the taking-up direction of the webbing 304.

Accordingly, when the deceleration of a predetermined value or more is applied to a vehicle body, the wire 318 is pulled, so that the wire 318 is wound tightly around the drum 310, and the connecting portions 314 become deformed, causing the clamping portions 312 to approach each other. The clamping portions 312 thus clamp the pretensioning shaft portion 308, so that the drum 310 is made integral with the spool 306. When the wire 318 is further pulled, the spool 306 is rotated by this tensile force, allowing the webbing 304 to be drawn in.

Meanwhile, a webbing retractor has been proposed which is provided with a force limiter for preventing the tensile force applied to the webbing from assuming a predetermined value or more.

In a webbing retractor (refer to Japanese Patent Application Laid-Open (JP-A) No. 7-47923) which is equipped with a so-called torsion bar-type force limiter, a cylindrical torsion bar capable of being torsionally deformed in the circumferential direction is inserted in the hollow cylindrical spool concentrically therewith, and one end of this torsion bar is fixed to the spool. At the time of a sudden deceleration of the vehicle, the other end of the torsion bar is locked by a lock mechanism. Since one end of the torsion bar is fixed to the spool, when a tensile force acting in the pulling-out direction is applied to the webbing at the time of the sudden deceleration of the vehicle, the torsion bar undergoes torsional deformation to rotate the spool, thereby preventing a tensile load being applied to the webbing from assuming a predetermined value or more.

With the webbing retractor 300, since the arrangement provided is such that the wire 318 is wound tightly around the drum 310 at the time of a sudden deceleration of the vehicle, which in turn causes the clamping portions 312 to clamp the pretensioning shaft portion 308, and the drum 310 rotates together with the spool 306, in the state in which the wire 318 is pulled out by a maximum degree, the webbing 304 cannot rotate further in the pulling-out direction of the webbing 304 due to the tensile force of the wire 318. Accordingly, if the above-described force limiter is simply installed in this webbing retractor 300, it is impossible to torsionally deform the torsion bar sufficiently.

SUMMARY OF THE INVENTION

In view of the above-described circumstances, it is an object of the present invention to provide a webbing retractor in which the spool can be rotated in the pulling-out direction of the webbing once the spool is rotated in the taking-up direction of the webbing by the pretensioner at the time of a sudden deceleration, thereby preventing the tensile force applied to the webbing by an energy absorbing member from assuming a predetermined value or more.

To this end, in accordance with one aspect of the present invention, there is provided a webbing retractor comprising: a spool around which a webbing is wound in such a manner as to be capable of being pulled out; an energy absorbing member which is deformed by the spool when a rotating force acting in a pulling-out direction of the webbing is applied to the spool at the time of a sudden deceleration of a vehicle, so as to prevent an increase in a tensile force of the webbing; a pretensioner which is connected to the spool when a deceleration of a predetermined value or more is applied, so as to rotate the spool in a taking-up direction of the webbing; and a canceling portion disposed between the spool and the pretensioner so as to cancel the stopping of rotation in a paying-out direction of the webbing by the pretensioner after operation of the pretensioner.

In the webbing retractor in accordance with the above-described aspect of the invention, in a normal traveling state of the vehicle in which a deceleration of a predetermined value or more is not applied, the pretensioner does not restrict the spool.

When the deceleration of a predetermined value or more is applied, the pretensioner and the spool are coupled with each other, and the webbing is taken up onto the spool, so that the webbing restricts the wearer without slack.

Next, when the webbing is pulled in the pulling-out direction, this tensile force is transmitted from the spool portion to the energy absorbing member. The function of the force limiter for preventing the force of application of the webbing exerted upon the wearer from assuming a predetermined value or more is started through the energy absorbing action, such as deformation, of the energy absorbing member. After the operation of the pretensioner, the canceling portion cancels the stopping of rotation of the spool in the webbing pulling-out direction by the pretensioner, so that the energy absorption is not restricted by the pretensioner, and the force of application of the webbing exerted upon the wearer does not assume a predetermined value or more.

It should be noted that, as the canceling portion, it is possible to adopt any member insofar as it is capable of canceling the stopping of rotation of the spool in the webbing pulling-out direction by the pretensioner after the operation of the pretensioner. For example, it is possible to cite a plastically deformable member, an elastically deformable member, a breakable member, a clutch, a friction plate, and the like.

DESCRIPTION OF THE PREFERRED EMBODIMENT

Figure 1:
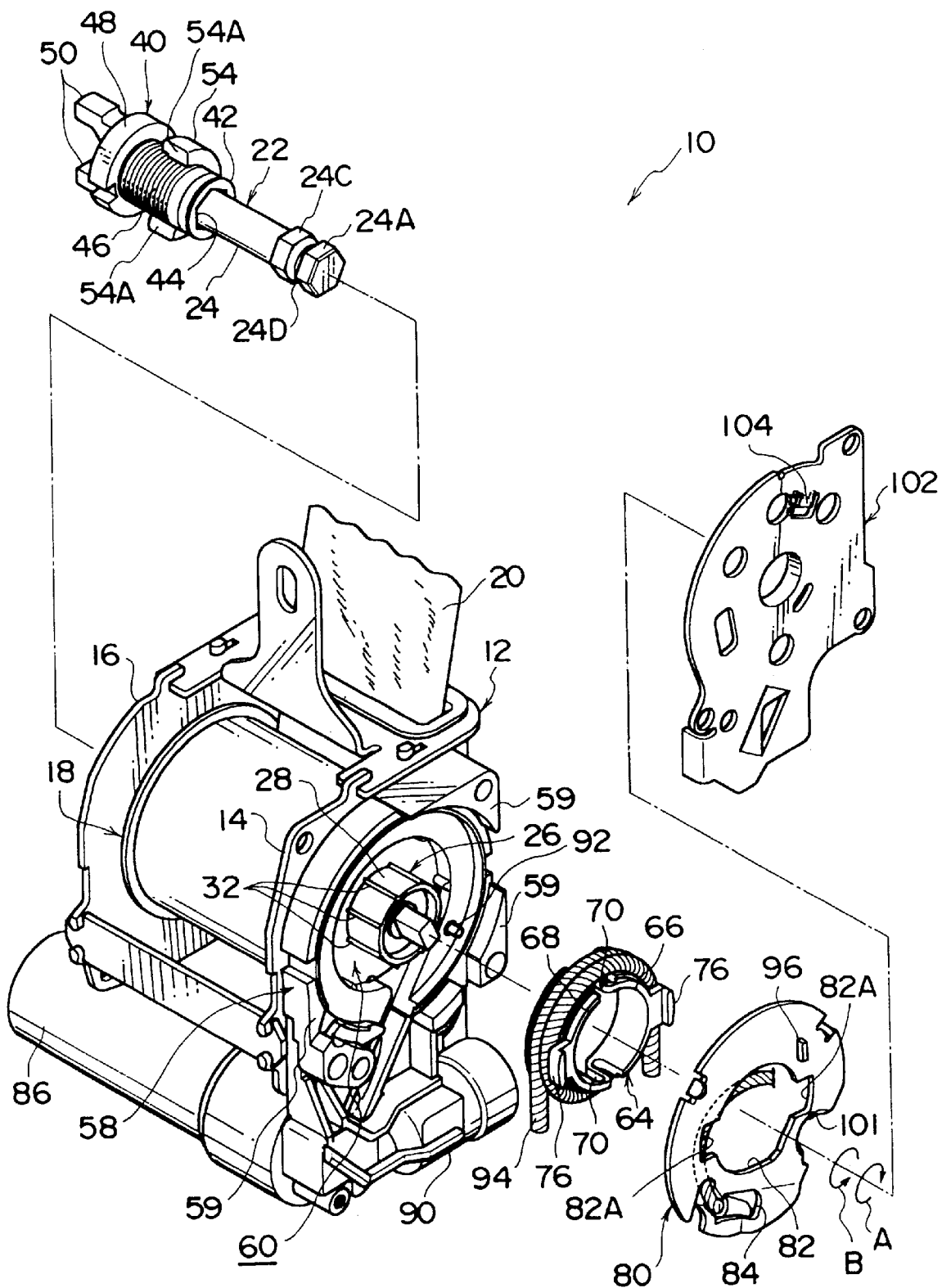
FIG. 1 is an exploded perspective view illustrating a webbing retractor in accordance with an embodiment of the present invention.
Figure 2:
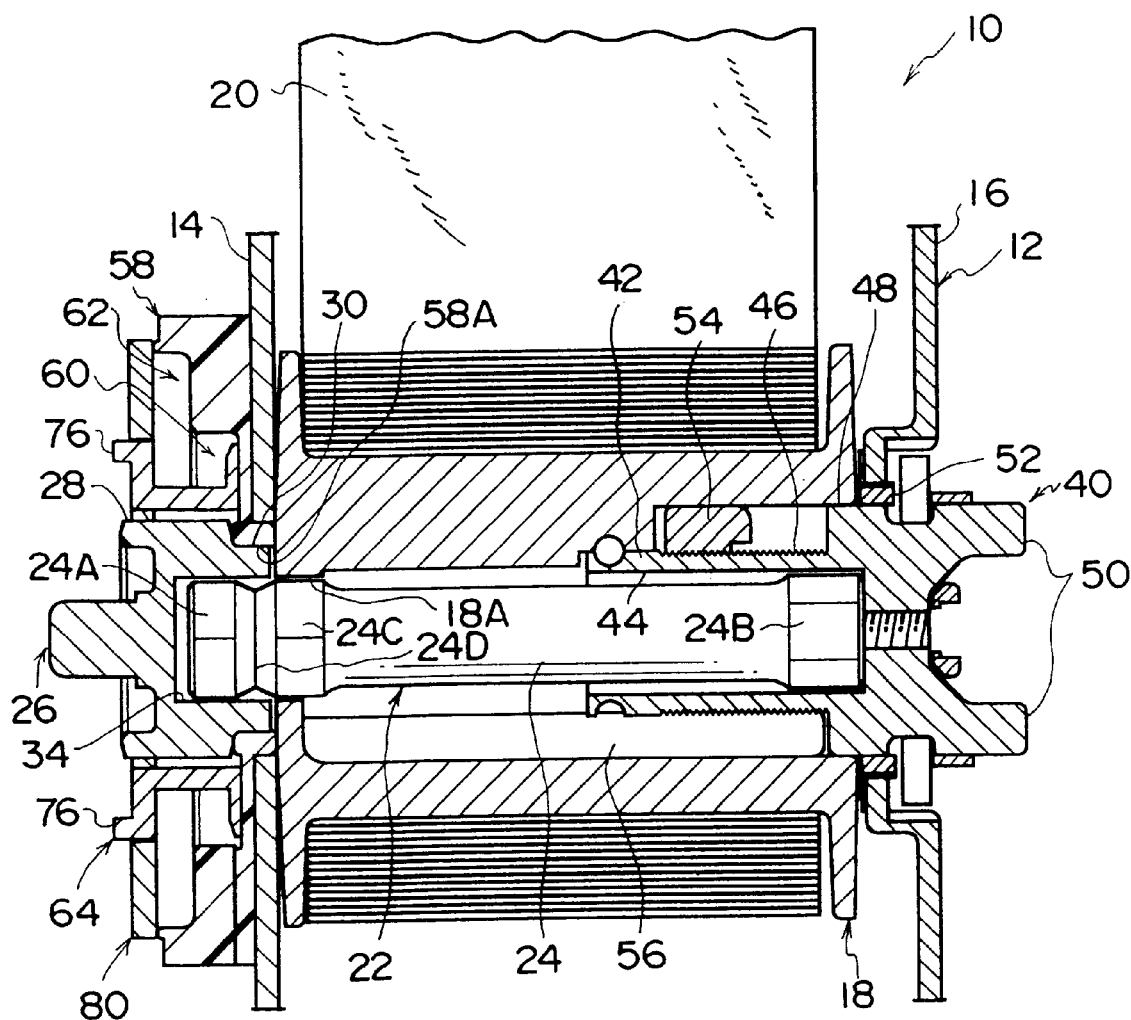
FIG. 2 is a cross-sectional view illustrating the webbing retractor in accordance with the embodiment of the present invention.
Figure 3:
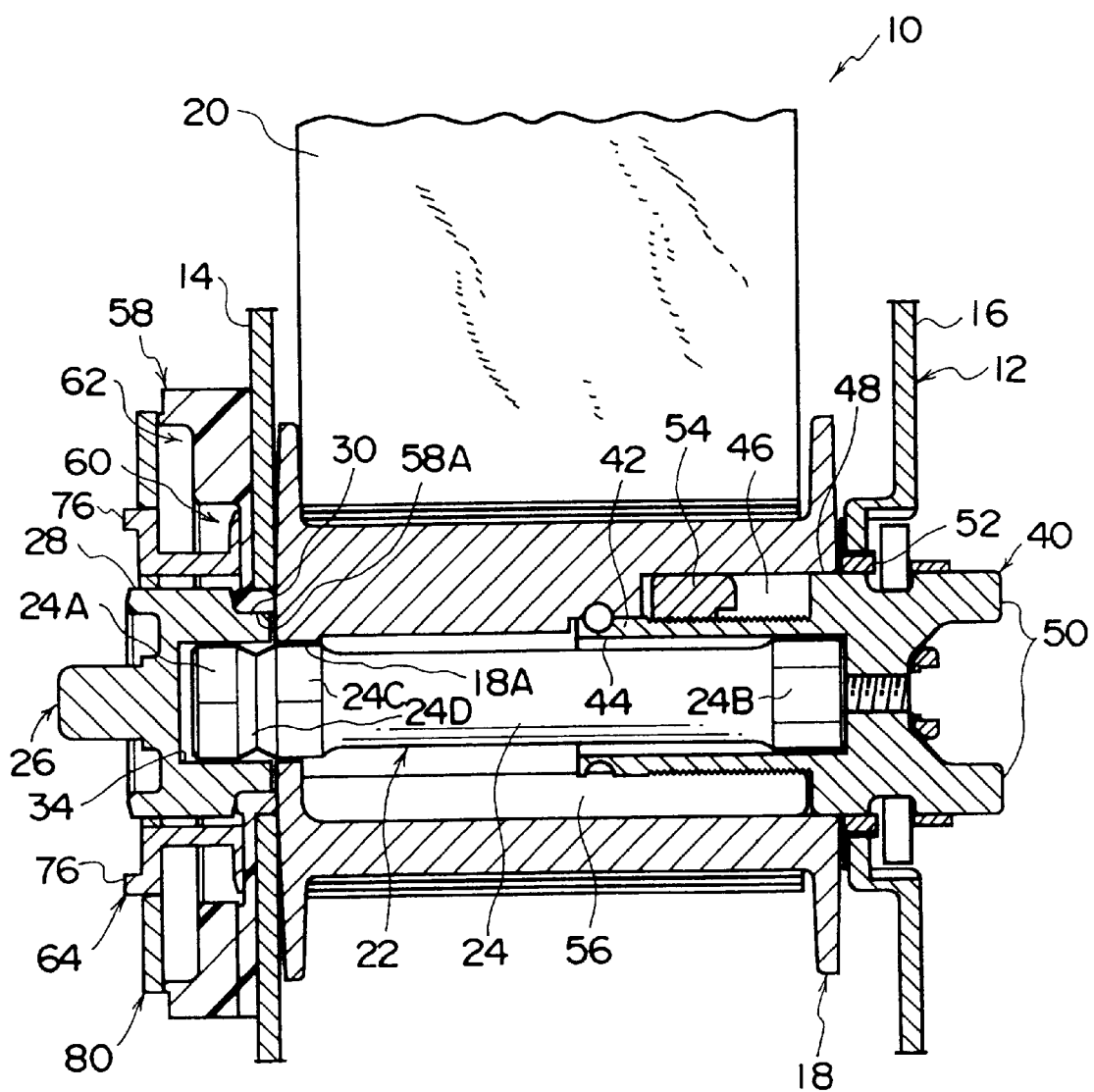
FIG. 3 is a cross-sectional view illustrating a state in which the webbing has been pulled out from the state shown in FIG. 2.

FIGS. 1 to 3 illustrate a webbing retractor 10 in accordance with an embodiment of the present invention.

The webbing retractor 10 has a frame 12 which is secured to a vehicle (not shown). The frame 12 has a pair of supporting plates 14 arranged in parallel with each other. A spool 18, which is formed in a substantially hollow cylindrical shape and has flanges projecting radially from axial ends thereof, is disposed between the supporting plates 14 and 16. One end of a webbing 20 is secured to this spool 18, and the webbing 20 is adapted to be taken up onto the spool 18. FIGS. 1 and 2 show a state in which the webbing 20 has been taken up onto the the spool 18. FIG. 3 shows a state in which the webbing 20 has been paid out from the spool 18.

A torsion section 22 is provided inside the spool 18 concentrically with a central axis of the spool 18. The torsion section 22 has a substantially cylindrical torsion bar 24 which serves as an energy absorbing member and is slightly longer than the axial length of the spool 18. The torsion bar 24 is formed of a plastically deformable material such as a metal, and undergoes plastic deformation and is twisted when a torsional force of a predetermined value or more is applied to the torsion bar 24 in its circumferential direction.

An inserting portion 24A in the shape of a hexagonal prism is formed at one end of the torsion bar 24. The inserting portion 24A is inserted in a hexagonal insertion hole 34 (see FIGS. 2 and 3) formed in a pretensioning shaft portion 26 which forms a part of the torsion section 22, and the torsion bar 24 and the pretensioning shaft portion 26 rotate integrally.

This pretensioning shaft portion 26 has a portion 28 to be clamped which is formed in a substantially hollow cylindrical shape and a hollow cylindrical inserting portion 30 which has a diameter smaller than the portion 28 to be clamped and is formed coaxially with the portion 28 to be clamped (see FIGS. 2 and 3). A plurality of projections 32 (see FIG. 1) whose longitudinal directions coincide with the direction of the central axis of the torsion bar 24 and whose distal ends are acutely pointed are provided projectingly around the outer periphery of the portion 28 to be clamped at predetermined intervals in the circumferential direction. When a pair of clamping portions 66 and 68 of a drum 64, which will be described later, have clamped the portion 28 to be clamped, the projections 32 bite into the inner surface of the drum 64 to prevent idling of the drum 64.

The inserting portion 30 is inserted in an axially supporting hole 58A in the center of a cover drum 58 attached to the outer side of the supporting plate 14 (on the side of the supporting plate 14 which is opposite to the side where the spool 18 is disposed). As a result, the torsion section 22 is pivotally supported by the supporting plate 14.

An engaging portion 24C having a shape substantially identical to that of the inserting portion 24A is formed on a portion of the torsion bar 24 which is located axially inwardly of the insertion portion 24A (on the upper left-hand side in FIG. 1, and on the right-hand side of the inserting portion 24A in FIGS. 2 and 3), and a fragile breakable portion 24D serving as a canceling portion is formed between the inserting portion 24A and the engaging portion 24C. The engaging portion 24C is engaged with a hexagonal portion 18A to be engaged which is formed on the inner periphery of the spool 18 at one end thereof, and the spool 18 and the torsion bar 24 rotate integrally. In addition, when a rotating force of a predetermined value or more is applied between the inserting portion 24A and the engaging portion 24C, the breakable portion 24D becomes broken.

A locking shaft portion 40 constituting a part of the torsion section 22 is disposed at the other end of the torsion bar 24 (on the upper left-hand side in FIG. 1, and on the right-hand side in FIGS. 2 and 3). The locking shaft portion 40 is formed in a substantially hollow cylindrical shape, and a hexagonal insertion hole, 44 is formed in the locking shaft portion 40 in such a manner as to extend in the axial direction from one end of the locking shaft portion 40. The locking shaft portion 40 is comprised of a tubular portion 42 having an external thread 46 on its outer periphery, a disk 48 which is formed at the other end of the tubular portion 42 to close the insertion hole 44 and extends radially outwardly of the tubular portion 42, and a member 50 to be locked which protrudes from the disk 48 in a bifurcated manner. An inserting portion 24B which is formed in the shape of a hexagonal prism at the other end of the torsion bar 24 is inserted in the insertion hole 44, so that the torsion bar 24 and the locking shaft portion 40 rotate integrally. FIG. 1 shows a state in which this inserting portion 24B is inserted in the insertion hole 44. As a result, the portion of the torsion bar 24 which extends between its engaging portion 24C and its inserting portion 24B functions as an energy absorbing member, and the inserting portion 24A and the breakable portion 24D extend from one end of this energy absorbing member.

Thus, in the state in which the inserting portion 24B of the torsion bar 24 is inserted in the insertion hole 44, the spool 18 is placed between the supporting plates 14 and 16, and the inserting portion 30 of the pretensioning shaft portion 26 is inserted into the axially supporting hole 58A in the central portion of the cover drum 58 from the supporting plate 14 side. The torsion bar 24 made integral with the locking shaft portion 40 is inserted into the spool 18 from the supporting plate 16 side, and the torsion bar 24 is arranged inside the spool 18 coaxially therewith, as shown in FIGS. 2 and 3. At this time, the torsion section 22 is positioned in a state in which a portion of the outer peripheral surface of the disk 48 which extends substantially from an axially central portion to one end thereof on the side of the tubular portion 42 abuts against the inner peripheral surface of the spool 18, and the central axis of the spool 18 and the central axis of the torsion bar 24 are aligned with each other. In addition, a portion of the outer peripheral surface of the disk 48 which extends substantially from the axially central portion to the other end thereof on the side of the member 50 to be locked is rotatably supported by the supporting plate 16 of the frame 12 by means of a ring 52. As a result, the spool 18 is rotatably supported by the frame 12.

The external thread 46 of the tubular portion 42 is threadedly engaged with a cut-away ring 54 which is formed substantially in an annular shape and in which a circumferential portion thereof is cut away and internal threads are cut on its inner side. One circumferential end face 54A (see FIG. 1) of the cut-away ring 54 abuts against a protrusion 56 (see FIGS. 2 and 3) provided projectingly on the inner periphery of the spool 18 in such a manner as to extend along the axial direction of the spool 18, so as to prevent the relative rotation of the cut-away ring 54 with respect to the spool 18, thereby allowing the cut-away ring 54 to be movable only in the axial direction with respect to the spool 18. In a normal state, the cut-away ring 54 is located at one end of the external thread 46 (on the pretensioning shaft portion 26 side, i.e., at the position shown in FIG. 2). However, if the spool 18 relatively rotates with respect to the locking shaft portion 40 whose rotation is stopped, the cut-away ring 54 also rotates together with the spool 18, and moves to the other end (to the disk 48 side, i.e., to the position shown in FIG. 4). This movement is stopped as the cut-away ring 54 abuts against the disc 48, and the rotation of the spool 18 with respect to the locking shaft portion 40 is also stopped. An inertial lock mechanism (not shown) similar to the one which is generally used is provided on the outer side of the supporting plate 16 (on the side which is opposite to the side where the spool 18 is disposed, and on the right-hand side in FIGS. 2 and 3). In the event that a deceleration of a predetermined value or more is applied to the vehicle in which the webbing retractor 10 is installed, or if the webbing 20 is pulled out rapidly, this inertial lock mechanism locks the member 50 to be locked so as to brake the rotation of the torsion section 22 in the pulling-out direction of the webbing 20, but does not lock the member 50 to be locked in the taking-up direction of the webbing 20.

Figure 5:
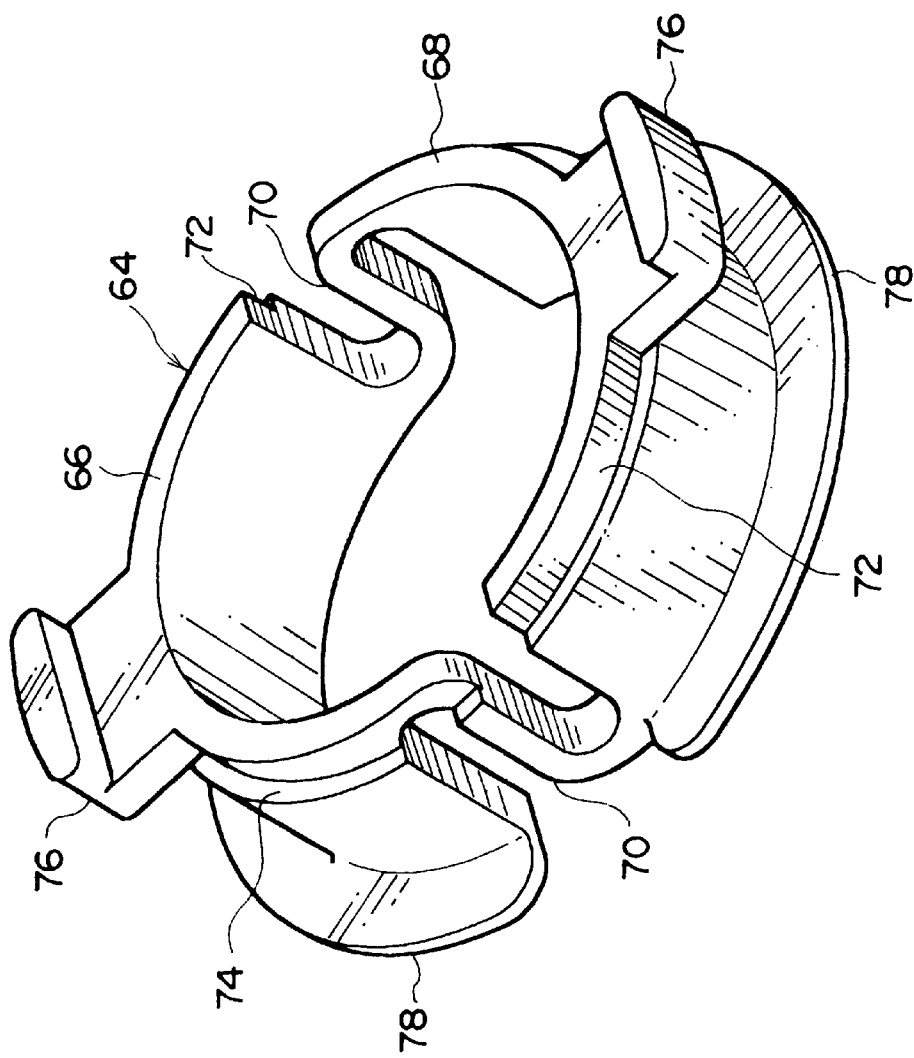
FIG. 5 is a perspective view illustrating a drum of the webbing retractor in accordance with the embodiment of the present invention.
Figure 6:
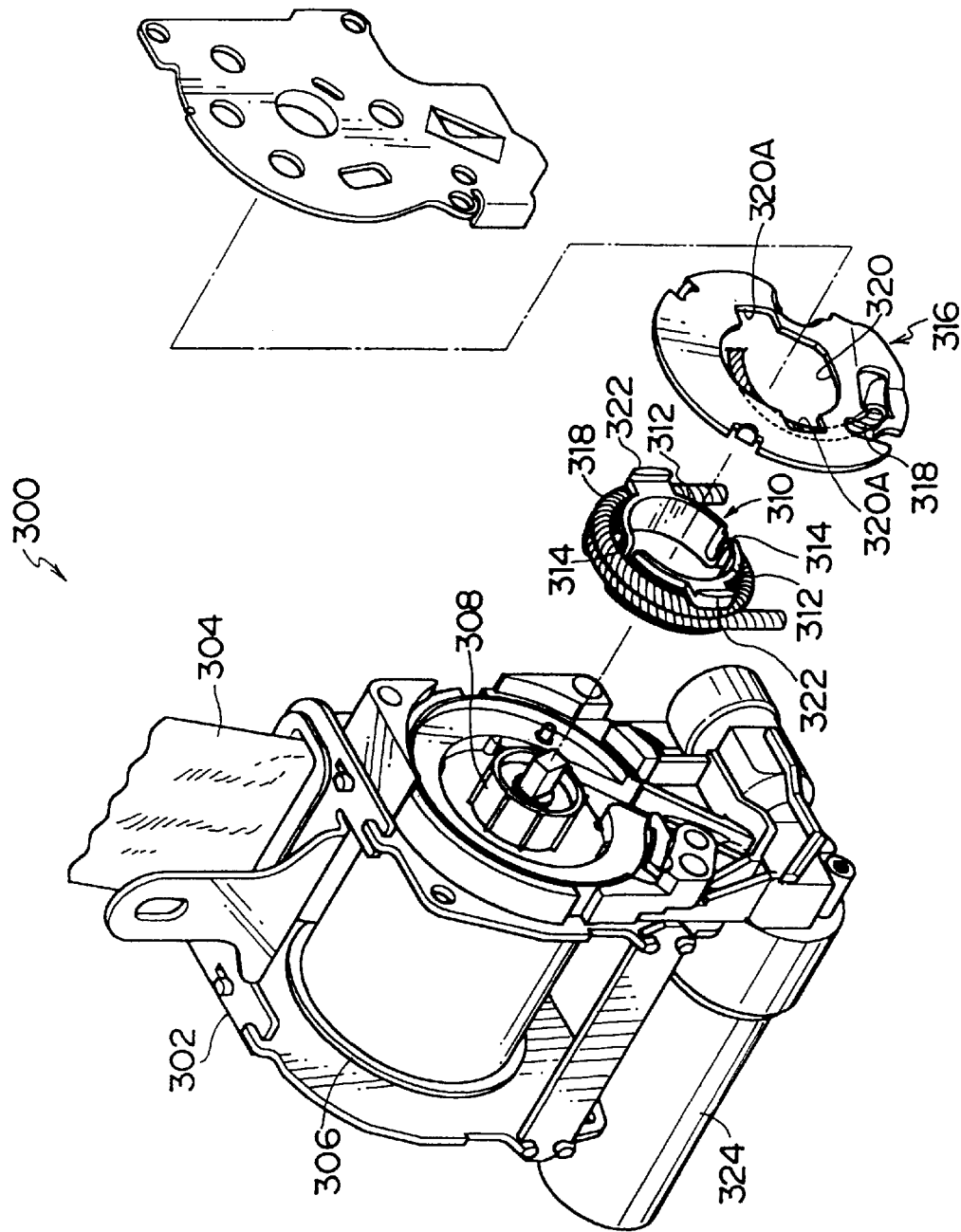
FIG. 6 is an exploded perspective view illustrating a conventional webbing retractor.

Meanwhile, the cover drum 58 having accommodating portions 60 and 62 whose diameters are respectively enlarged in steps radially outward from the rotational axis of the torsion bar 24 is fixed to the outer side of the supporting plate 14 (on the left-hand side in FIGS. 2 and 3). The drum 64 around which a wire 94 (see FIG. 1) which will be described later is wound is disposed coaxially with the torsion bar 24 in the accommodating portion 60 having a smaller diameter (i.e., the accommodating portion closer to the supporting plate 14). The drum 64 is formed of a metal (e.g., aluminum or the like) which is softer than the locking shaft portion 40 and the pretensioning shaft portion 26. In addition, as shown in detail in FIG. 5, the drum 64 is arranged such that the pair of semicircular clamping portions 66 and 68 are opposed to each other to form a substantially circular cylinder. In this state, opposing circumferential ends of the clamping portions 66 and 68 are connected by a pair of substantially S-shaped compression portions 70 formed integrally with the clamping portions 66 and 68. Normally, in the state in which the drum 64 is disposed in the accommodating portion 60 (see FIGS. 2 and 3), there are predetermined slight gaps between the inner surfaces of the clamping portions 66 and 68 and the distal ends of the projections 32 of the portion 28 to be clamped, so that the drum 64 is separated from the pretensioning shaft portion 26 in the accommodating portion 60. However, when force acting in the direction in which the clamping portions 66 and 68 approach each other is applied to the clamping portions 66 and 68, and the compression portions 70 (see FIG. 5) undergo compressive deformation to cause the clamping portions 66 and 68 to approach each other, the clamping portions 66 and 68 clamp the portion 28 to be clamped. Since the drum 64 is formed of a metal which is softer than the pretensioning shaft portion 26, the projections 32 bite into the inner surfaces of the clamping portions 66 and 68. For this reason, the drum 64 and the pretensioning shaft portion 26 rotate integrally.

At one end of each of the clamping portions 66 and 68, its outer peripheral surface is cut away radially inward to form a reduced-diameter portion 72, and the surface between the portion whose diameter is not reduced and the reduced-diameter portion 72 is formed as a positioning step portion 74. Further, an engaging piece 76 projects substantially from a circumferential center of each reduced-diameter portion 72 in a radially outward direction.

At the other end of each of the clamping portions 66 and 68, a flange 78 projecting radially outward is formed to reinforce each of the clamping portions 66 and 68.

As shown in FIG. 1, a substantially disk-shaped drive plate 80 is disposed on the outer side of the cover drum 58 (on the side of the cover drum 58 which is away from the supporting plate 14, i.e., on the left-hand side in FIGS. 2 and 3). The drive plate 80 is surrounded by ribs 59 provided uprightly on the cover drum 58 at three positions around the outer periphery of the drive plate 80, is made coaxial with the torsion bar 24, and is made rotatable. A substantially circular insertion hole 82, into which the reduced-diameter portions 72 of the drum 64 are inserted, is formed in the center of the drive plate 80, and when the reduced-diameter portions 72 are inserted, the positioning step portions 74 of the drum 64 abut against the drive plate 80, thereby allowing the drum 64 to be positioned in the axial direction. A pair of enlarged-diameter portions 82A, into which the pair of engaging pieces 76 are inserted, are formed in the insertion hole 82, and the drive plate 80 and the drum 64 are integrally rotated by the engaging pieces 76 inserted in the enlarged-diameter portions 82A.

A securing portion 84, into which a tubular member attached to one end of the wire 94 is fitted and is secured, is formed on the drive plate 80. The wire 94 with one end secured to the securing portion 84 is wound round the periphery of the drum 64 a number of turns (nearly two turns in this embodiment), and the other end is wound round a piston (not shown) inside a cylinder 86 provided on the frame 12, and is secured to an outer portion of the cylinder 86. When a sensor (not shown) detects that a deceleration of a predetermined value or more has been applied to the vehicle in which the webbing retractor 10 is installed, a gas generator (not shown) inside a base cartridge 90 provided on the frame 12 is operated to rapidly move the piston toward the innermost part of the cylinder 86. This movement of the piston causes the wire 94 to be rapidly drawn in, thereby applying a rotating force to the drive plate 80.

As shown in FIG. 1, a shear pin 92 is provided uprightly on the frame 12 through the cover drum 58, and since this shear pin 92 is engaged in a recessed portion 101 formed on the drive plate 80, the drive plate 80 normally does not rotate in the taking-up direction of the webbing (in the direction of arrow A in FIG. 1). However, when the wire 94 is rapidly drawn into the cylinder 86, and a rotating force of a predetermined value or more is applied to the drive plate 80, the shear pin 92 is pressed by the recessed portion 101 and is broken off, allowing the drive plate 80 to rotate.

A cover plate 102 is further disposed on the outer side of the drive plate 80, and is fixed to the cover drum 58. The state in which the drum 64 and the drive plate 80 are accommodated in the accommodating portions 60 and 62 of the cover drum 58 is maintained by this cover plate 102.

A stopper projection 104 is provided on the cover plate 102 in such a manner as to project toward the drive plate 80.

Meanwhile, a rotating projection 96 which rotates with the drive plate 80 is provided projectingly on the drive plate 80. When the deceleration of a predetermined value or more is not applied to the webbing retractor 10, the rotating projection 96 abuts against the stopper projection 104 on the lower right-hand side in FIG. 1 (the taking-up direction side of the webbing 20). Consequently, the drive plate 80 is prevented from rotating in the pulling-out direction of the webbing (in the direction of arrow B in FIG. 1) by the stopper projection 104.

On the other hand, when the wire 94 is drawn into the cylinder 86, and the drive plate 80 rotates about 360' in the taking-up direction of the webbing (in the direction of arrow A in FIG. 1), the wire 94 is drawn into the cylinder 86 by the piston, the piston reaches the bottom of the cylinder 86, and the pulling in of the wire 94 is completed, whereupon the rotation of the drive plate 80 stops.

Next, a description will be given of the operation and effect of the webbing retractor 10 in accordance with this embodiment.

In the normal state, i.e., when the deceleration of the vehicle in which the webbing retractor 10 is installed is less than a predetermined value, the unillustrated inertial lock mechanism does not lock the member 50 to be locked. Since the gas generator in the base cartridge 90 is not operated, the wire 94 is not drawn into the cylinder 86. For this reason, the spool 18 (see FIGS. 1 to 3) rotates freely, so that the webbing 20 can be paid out or taken up.

When the deceleration of a predetermined value or more is applied to the vehicle, the inertial lock mechanism locks the rotation of the member 50 to be locked in the pulling-out direction of the webbing 20 (in the direction of arrow B in FIG. 1). Hence, the spool 18, which rotates together with the torsion section 22, is also locked in its rotation in the pulling-out direction of the webbing 20, making it impossible to pull out the webbing 20 any further.

In addition, since the gas generator is operated, and the unillustrated piston is thereby moved to the innermost part of the cylinder 86, the wire 94 is rapidly pulled into the cylinder 86. Here, since the drive plate 80 is prevented from rotating by the shear pin 92, the drum 64 with the wire 94 wound therearound is tightly wound suddenly, so that the compression portions 70 (see FIG. 5) undergo compressive deformation to cause the clamping portions 66 and 68 to approach each other, thereby clamping the portion 28 to be clamped of the pretensioning shaft portion 26. Since the drum 64 is formed of a metal which is softer than the portion 28 to be clamped, the projections 32 of the portion 28 to be clamped bite into the inner surfaces of the clamping portions 66 and 68, so that the drum 64 and the pretensioning shaft portion 26 are made integral.

As the wire 94 is further pulled into the cylinder 86, a rotating force acts on the drive plate 80, and the recessed portion 101 presses the shear pin 92 and breaks it off. As a result, the drive plate 80 rotates in the taking-up direction of the webbing (in the direction of arrow A in FIG. 1). Since the engaging pieces 76 of the drum 64 are inserted in the enlarged-diameter portions 82A of the insertion hole 82, the drum 64 rotates together with the drive plate 80. As the drum 64 rotates, the spool 18 rotates in the taking-up direction of the webbing 20 (in the direction of arrow A in FIG. 1) via the engaging portion 24C of the torsion bar 24. When the piston has moved to the innermost part of the cylinder 86, and the wire 94 has been pulled most into the cylinder 86, the webbing 20 assumes a state in which it is most taut. As a result, it is possible to apply the webbing 20 to the wearer of the webbing 20 without slack.

Next, when a pulling-out force of a predetermined value or more is applied to the webbing 20 by the inertial force of the wearer of the webbing 20, this force is applied to the spool 18 as a rotating force acting in the pulling-out direction of the webbing 20 (in the direction of arrow B in FIG. 1). Here, since the unillustrated inertial lock mechanism locks the rotation of the locking shaft portion 40 in the pulling-out direction of the webbing 20, the rotation of the torsion bar 24, whose inserting portion 24B at the other end thereof is inserted in the insertion hole 44 of the locking shaft portion 40, is also locked at the other end. Meanwhile, one end of the torsion bar 24 rotates integrally with the spool 18 since the engaging portion 24C is engaged with the portion 18A to be engaged. The action of the force limiter for preventing a tensile force of a predetermined value or more from being applied to the webbing 20 begins to take place only when the torsion bar 24 undergoes plastic deformation and begins to be twisted after the rotating force of the spool 18 is transmitted to the torsion bar 24. At this time, when the spool 18 rotates with respect to the locking shaft portion 40, the end face 54A of the cut-away ring 54 is pressed by the protrusion 56, and the cut-away ring 54 is also rotated, and begins to move toward the disk 48.

In addition, since the drum 64 which has bitten into the portion 28 to be clamped of the pretensioning shaft portion 26 also rotates in the pulling-out direction of the webbing 20, the drive plate 80 also rotates in the pulling-out direction of the webbing 20. Hence, the wire 94 is pulled inside the cylinder 86, so that the piston moves toward its initial position inside the cylinder 86.

Figure 4:
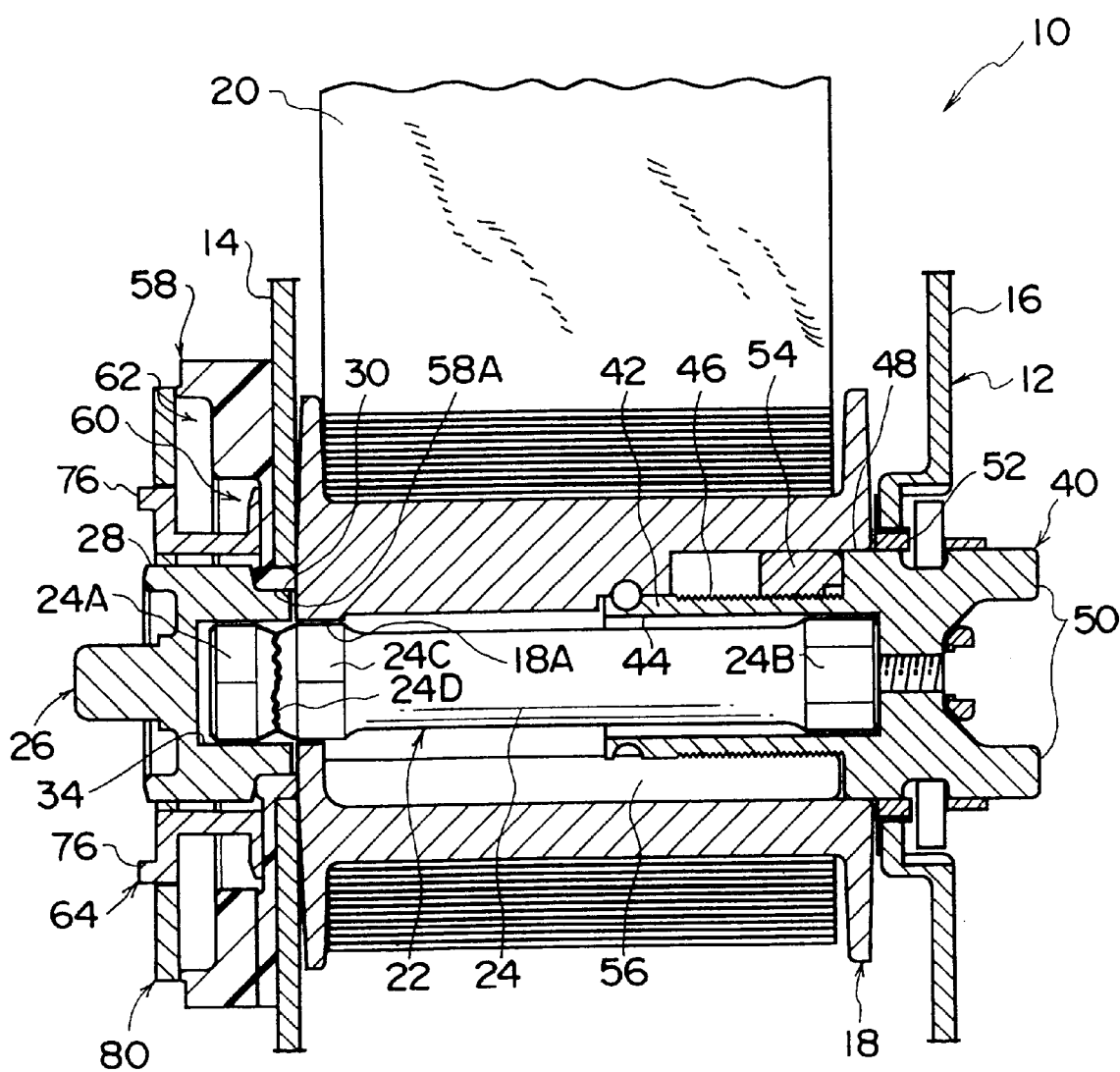
FIG. 4 is a cross-sectional view illustrating a state in which a breakable portion has been broken in the webbing retractor in accordance with the embodiment of the present invention.

When the drive plate 80 rotates substantially to its initial position, the rotating projection 96 abuts against the stopper projection 104, so that the rotation of the drive plate 80 is stopped. In this state, if the rotating force is further applied to the spool 18 in the pulling-out direction of the webbing 20 (in the direction of arrow B in FIG. 1), since the inserting portion 24A of the torsion bar 24 is inserted in the insertion hole 34 of the pretensioning shaft portion 26, the inserting portion 24A of the torsion bar 24 does not rotate due to the drive plate whose rotation is stopped. However, the engaging portion 24C of the torsion bar 24 is subjected to the rotating force of the spool 18. For this reason, the rotating force is applied to the breakable portion 24D formed in the torsion bar 24, so that the breakable portion 24D becomes broken, as shown in FIG. 4. As a result, the portion of the torsion bar 24 extending from the remaining portion of the breakable portion 24D to the inserting portion 24B is separated from the drive plate 80, and becomes relatively rotatable with respect to the drive plate 80. Hence, the torsion bar 24 is further twisted and continues the action of the force limiter, allowing the spool 18 to rotate in the pulling-out direction of the webbing 20. Then, the torsion bar 24 undergoes torsional deformation until the rotating force applied to the pretensioning shaft portion 26 via the spool 18 due to the pulling out of the webbing 20 is balanced with the torsional reaction force of the torsion bar 24. The spool (see FIGS. 1 to 3) also rotates in correspondence with the angle of rotation due to the torsional deformation of the torsion bar 24, and the webbing 20 is pulled out, thereby allowing the action of the force limiter to be exhibited for preventing the tensile load applied to the webbing 20 from assuming a predetermined value or more.

It should be noted that in a case where the rotating force applied to the spool 18 is large, the cut-away ring 54 which has moved toward the disk 48 abuts against the disk 48 (see FIG. 4), so that the cut-away ring 54 ceases to move further. As a result, since the rotation of the spool 18 is also stopped, excessive torsional deformation of the torsion bar 24 is hindered, so that the torsion bar 24 is prevented from becoming wrenched off. Further, since it is possible to stop the rotation of the spool 18 as the cut-away ring 54 rotates and abuts against the disc 48, by adjusting the the initial position of the cut-away ring 54 it is possible to alter the amount of relative rotation of the spool 18 with respect to the locking shaft portion 40. As a result, by adjusting the amount of twist of the torsion bar 24, it is possible to adjust the amount of the webbing 20 being pulled out during the operation of the force limiter.

Thus, with the webbing retractor 10 in accordance with this embodiment, when the rotating force acting in the pulling-out direction of the webbing 20 is applied to the spool 18 after the drum 64 clamps the pretensioning shaft portion 26, the breakable portion 24D of the torsion bar 24 is broken, so that it is possible to allow the torsion bar 24 to display the action of the force limiter by causing the torsion bar 24 to undergo torsional deformation sufficiently. In this case, even if the outside diameter of the breakable portion 24D is the same as that of the main portion of the torsion bar 24, the breakable portion 24D is broken since the axial length is short, but the torsion bar 24 only plastically undergoes torsional deformation. The outside diameter of the breakable portion 24D may be increased or decreased as necessary.

It should be noted that the canceling portion is not limited to the above-described breakable portion 24D, and it is possible to adopt various arrangements insofar as the pretensioner and the spool 18 are made integral under the load of rotation in the taking-up direction of the webbing 20 due to the pretensioner, while the spool 18 is made relatively rotatable with respect to the pretensioner under the load acting in the pulling-out direction of the webbing 20. For example, an arrangement may be provided such that, instead of the breakable portion 24D, a deformable portion which undergoes plastic deformation or elastic deformation is formed, and as this deformable portion is deformed, the stopping of the rotation in the pulling-out direction of the webbing 20 by the pretensioner is canceled, allowing the pretensioning shaft portion 26 to be relatively rotatable with respect to the drive plate 80 of the pretensioner. In addition, a clutch, a friction plate, or the like may be alternatively used.

In addition, as for the timing when the canceling portion cancels the stopping of the rotation in the pulling-out direction of the webbing by the pretensioner, any timing may be adopted insofar as it takes place after the operation of the pretensioner. For example, it is possible to adopt a timing when the rotating force in the pulling-out direction of the webbing is applied to the spool 18 after the operation of the pretensioner, or a timing when the spool 18 has rotated in the pulling-out direction of the webbing after the operation of the pretensioner.

Further, the energy absorbing member is not limited to the above-described torsion bar 24, and it is possible to adopt other types of energy absorbing member insofar as they are capable of absorbing kinetic energy by undergoing deformation, causing friction, or causing a viscous fluid to flow due to the rotation of the spool 18 in the pulling-out direction of the webbing 20, so as to prevent an increase in the tensile force of the webbing 20. Further, these energy absorbing members may not be concentric with the spool 18.

Further, in the foregoing description, a case has been cited in which the lock portion which locks the rotation of the spool 18 in the pulling-out direction of the webbing 20 upon detection of the deceleration of a predetermined value or more and permits rotation only in the taking-up direction of the webbing 20 is provided at the other end of the spool 18. However, this lock portion is not necessarily essential, and it is possible to adopt, for instance, the structure of an automatic locking retractor (ALR) which locks the rotation of the spool 18 in the pulling-out direction after the wearing of the webbing 20 irrespective of the relative magnitude of the deceleration, and permits rotation only in the taking-up direction of the webbing 20. Furthermore, if the lock portion is capable of locking the rotation of the spool 18, it is not necessary for the lock portion to be provided at the other end of the spool 18, and it suffices if the lock portion is attached to the spool 18 via the energy absorbing member.

In addition, although, in the above description, a case has been shown in which the pretensioning shaft portion 26 rotates together with the spool 18 at the time of a sudden deceleration of the vehicle via the torsion bar 24 disposed inside the spool 10, the position of the torsion bar 24 is not limited to the same, and it suffices if the arrangement provided is such that the pretensioning shaft portion 26 rotates together with the spool 18 via the torsion bar 24 at the time of a sudden deceleration of the vehicle. For example, the torsion bar 24 may be attached to one end of the spool 18 in such a manner as to project from that end.

What is claimed is:

1. A webbing retractor comprising:
 a spool around which a webbing is wound in such a manner as to be capable of being pulled out;
 an energy absorbing member which is actuated by said spool when a rotating force acting in a pulling-out direction of the webbing is applied to said spool at the time of a sudden deceleration of a vehicle, so as to prevent an increase in a tensile force of the webbing;
 a pretensioner which is connected to said spool when a deceleration of a predetermined value or more is applied, so as to rotate said spool in a taking-up direction of the webbing; and
 a canceling portion including a deformable portion disposed between said spool and said pretensioner for deformably canceling the stopping of rotation in a paying-out direction of the webbing by said pretensioner after operation of said pretensioner.

2. A webbing retractor according to claim 1, wherein said canceling portion cancels the stopping of rotation in the paying-out direction of the webbing by said pretensioner in a state in which the rotating force acting in the pulling-out direction of the webbing is applied to said spool after the operation of said pretensioner.

3. A webbing retractor according to claim 1, wherein said canceling portion cancels the stopping of rotation in the paying-out direction of the webbing by said pretensioner in a state in which said spool is rotated in the pulling-out direction of the webbing after the operation of said pretensioner.

4. A webbing retractor according to claim 1, wherein said canceling portion cancels the stopping of rotation in the paying-out direction of the webbing by said pretensioner if a deforming force applied to said energy absorbing member by the rotating force in the pulling-out direction of the webbing exceeds a predetermined value after the operation of said pretensioner.

5. A webbing retractor according to claim 1, wherein said canceling portion is a breakable portion which is connected to said spool and said pretensioner, and separates a side thereof connected to said spool and a side thereof connected to said pretensioner as said canceling portion is broken.

6. A webbing retractor according to claim 1, wherein said energy absorbing member is a torsion bar having one end connected to said spool and another end connected to an inertial lock mechanism which responds to an acceleration.

7. A webbing retractor according to claim 6, wherein said torsion bar is disposed coaxially with said spool.

8. A webbing retractor according to claim 6, wherein said canceling portion connected to said pretensioner extends integrally from one end of said torsion bar so as to serve as a portion subject to torsional breakage.

9. A webbing retractor according to claim 6, wherein said torsion bar is connected to said spool and said inertial lock mechanism through engagement between a prismatic bar and a prismatic hole.

10. A webbing retractor according to claim 6, wherein said canceling portion extends to one end of said energy absorbing member.

11. A webbing retractor according to claim 7, wherein an inserting portion which is connected to said pretensioner extends from said energy absorbing member, and said canceling portion is disposed between said inserting portion and said energy absorbing member.

12. A webbing retractor according to claim 11, wherein said inserting portion has a prismatic shape.

13. A webbing retractor according to claim 1, wherein said energy absorbing member is inserted into said spool coaxially therewith, a prismatic portion at one end of said energy absorbing member is engaged with an inertial lock mechanism which responds to an acceleration, an inserting portion at another end of said energy absorbing member is engaged with said pretensioner, an engaging portion adjacent to said inserting portion is engaged with said spool, a portion between said inserting portion and said engaging portion serves as a breakable portion, and a portion between said engaging portion and said prismatic portion at said one end serves as an energy absorbing portion.

14. A webbing retractor comprising:
a spool around which a webbing is wound in such a manner as to be capable of being pulled out;
an energy absorbing member which is deformed by said spool when a rotating force acting in a pulling-out direction of the webbing is applied to said spool at the time of a sudden deceleration of a vehicle, so as to prevent an increase in a tensile force of the webbing;
a pretensioner which is connected to said spool when a deceleration of a predetermined value or more is applied, so as to rotate said spool in a taking-up direction of the webbing; and
a canceling portion including a yieldable portion of said energy absorbing member disposed between said spool and said pretensioner so as to cancel the stopping of rotation in a paying-out direction of the webbing by said pretensioner if a deforming force applied to said energy absorbing member by the rotating force in the pulling-out direction of the webbing exceeds a predetermined value after operation of said pretensioner.

15. A webbing retractor according to claim 14, wherein said canceling portion is a breakable portion which is connected to said spool and said pretensioner, and separates a side thereof connected to said spool and a side thereof connected to said pretensioner as said canceling portion is broken.

16. A webbing retractor according to claim 14, wherein said energy absorbing member is a torsion bar having one end connected to said spool and another end connected to an inertial lock mechanism which responds to an acceleration, and said canceling portion connected to said pretensioner extends integrally from one end of said torsion bar so as to serve as a portion subject to torsional breakage.

17. A webbing retractor according to claim 14, wherein said energy absorbing member is disposed coaxially with said spool.

18. A webbing retractor according to claim 17, wherein an inserting portion which is connected to said pretensioner extends from said energy absorbing member, and said canceling portion is disposed between said inserting portion and said energy absorbing member.

19. A webbing retractor according to claim 14, wherein said energy absorbing member is inserted into said spool coaxially therewith, a prismatic portion at one end of said energy absorbing member is engaged with an inertial lock mechanism which responds to an acceleration, an inserting portion at another end of said energy absorbing member is engaged with said pretensioner, an engaging portion adjacent to said inserting portion is engaged with said spool, a portion between said inserting portion and said engaging portion serves as a breakable portion, and a portion between said engaging portion and said prismatic portion at said one end serves as an energy absorbing portion.

20. A webbing retractor comprising:
a spool around which a webbing is wound in such a manner as to be capable of being pulled out;
a pretensioner which is connected to said spool when a deceleration of a predetermined value or more is applied, so as to rotate said spool in a taking-up direction of the webbing;
an energy absorbing member which is inserted into said spool coaxially therewith, wherein a prismatic portion at one end of said energy absorbing member is engaged with an inertial lock mechanism which responds to an acceleration, an inserting portion at another end of said energy absorbing member is engaged with said pretensioner, an engaging portion adjacent to said inserting portion is engaged with said spool, a portion between said inserting portion and said engaging portion serves as a breakable portion, and a portion between said engaging portion and said prismatic portion at said one end serves as an energy absorbing portion which is deformed by said spool when a rotating force acting in a pulling-out direction of the webbing is applied to said spool at the time of a sudden deceleration of a vehicle, so as to prevent an increase in a tensile force of the webbing; and a canceling portion including said breakable portion disposed between said spool and said pretensioner so as to cancel the stopping of rotation in a paying-out direction of the webbing by said pretensioner after operation of said pretensioner.

* * * * *